Fig_1

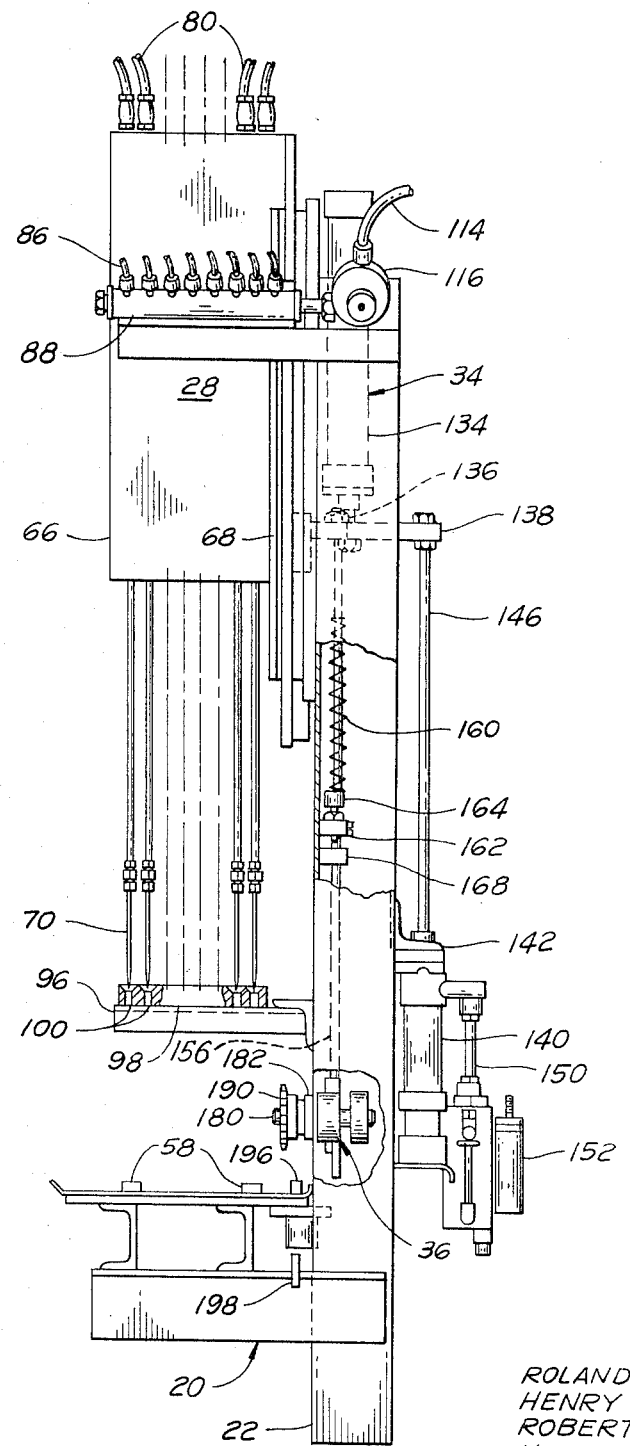
Fig. 2
ROLAND A. BLOMGREN
HENRY J. DOKTER
ROBERT E. MURPHY
HARRY W. CAREY
BURTON J. WAXLER
INVENTORS
BY 
ATTORNEY.

ROLAND A. BLOMGREN
HENRY J. DOKTER
ROBERT E. MURPHY
HARRY W. CAREY
BURTON J. WAXLER
INVENTORS.

INVENTORS.
ROLAND A. BLOMGREN
HENRY J. DOKTER
ROBERT E. MURPHY
HARRY W. CAREY
BURTON J. WAXLER
BY
E.T. McCabe
ATTORNEY United States Patent Office 3,519,442
Patented July 7, 1970

3,519,442
APPARATUS FOR DISTRIBUTING A SUBSTANCE
THROUGHOUT A MASS OF MATERIAL
Roland A. Blomgren, Glen Ellyn, and Henry J. Dokter
and Robert E. Murphy, Chicago, Ill., and Harry W.
Carey and Burton J. Waxler, Lima, Ohio, assignors to
Swift & Company, Chicago, Ill., a corporation of
Illinois
Filed Sept. 15, 1967, Ser. No. 668,314
Int. Cl. A23l 3/34
U.S. Cl. 99—256                                    10 Claims

ABSTRACT OF THE DISCLOSURE

An apparatus for injecting first a quantity of gas and then a quantity of additive substance in mixture with gas into a mass of solid or semi-solid material is comprised of a rectangular box for holding the material and a vertically reciprocable injector assembly connected to pressurized sources of gas and additive substance. The box has a foraminous cover to prevent upward displacement of the material therein, and one of the box or injector assembly is indexed horizontally in coordination with the vertical reciprocation of the injector assembly. Valves in the connecting lines for gas and additive substances are actuated in accordance with the vertical movement of the injector assembly. In the preferred form the material box is indexed horizontally by a mechanical element that includes a positive positioning mechanism so as to insure accurate placement and uniform penetration of the material being processed.

---

The present invention is directed to an improved apparatus for distributing a substance throughout a mass of material; and more specifically is directed to an apparatus for automatically introducing a mixture of gas and enzyme into portions of meat.

The present invention is of particular advantage in the treatment of meat products, although it will also have application elsewhere. It has long been the practice in the meat industry to inject various substances into portions of meat for the purpose of pickling or tenderizing. For example, bacon slabs and ham pieces have been injected with pickle solutions by an apparatus commonly known as a "stitch pumper." In such an apparatus the product is advanced, stepwise, while a row of hollow needles, connected to a pressurized source of pickling liquid, is reciprocated thereinto. Similar apparatus has been suggested for introducing liquid enzyme materials into meats. However, such apparatus has been capable of penetrating the product only a relatively short distance and it has been necessary to pass bodies of meat through the apparatus twice, inverting the meat in the interim, to obtain acceptable distribution of the injected substance. Even so, prior apparatus has not been capable of quickly effecting a uniform distribution of the injected substance. Normally such items are given further treatment such as holding and/or soaking to allow the injected substance to disperse throughout the meat. Also such apparatus has heretofore been incapable of penetrating deeply into large bodies of meat with the result that its application has been limited to small and relatively thin items.

An improved injection technique is disclosed in U.S. Pat. No. 3,216,826, to Wattenbarger, whereby the cellular structure of meat tissue is first expanded by the injection of a gas under pressure and then the substance to be added is injected in mixture with an additional quantity of the gas. It is believed that the expansion of the cellular tissue causes the material to be more receptive to the additive substance and thereby permits more even penetration over greater areas. The technique, in theory, is applicable to great depths in bodies of meat. However, heretofore the technique has been practiced in great part by hand. Automatic apparatus has not been available for this purpose.

Accordingly, it is a principal object of the present invention to provide an improved apparatus operable over a wide range of penetration to inject substances into a material.

It is another object of the present invention to provide an improved automatic apparatus for injecting a mixture of gas and additive substances into a material.

It is still another object of the present invention to provide an improved injection apparatus capable of providing even distribution and a uniform injection pattern.

It is a further object of the present invention to provide an improved apparatus for injecting a mixture of gas and enzyme into a body of meat.

The present invention comprises a basic combination of means comprising an enclosure means for the material to be injected; and a vertically reciprocable injector means mounted for cooperation therewith. A foraminous top member is provided on the enclosure means to prevent the body of material from being upwardly displaced therefrom. Additionally pressurized supplies of gas and additive substance are connected to the injector means. An indexing means is connected to move one of the enclosure means and the injector means horizontally with respect to the other.

Further objects and advantages of the present invention will become apparent upon reading the following detailed description of a preferred embodiment of the apparatus in conjunction with the accompanying drawings wherein:

FIG. 2 is a side elevation of the apparatus of FIG. 1 with certain parts removed;

Figure 1:
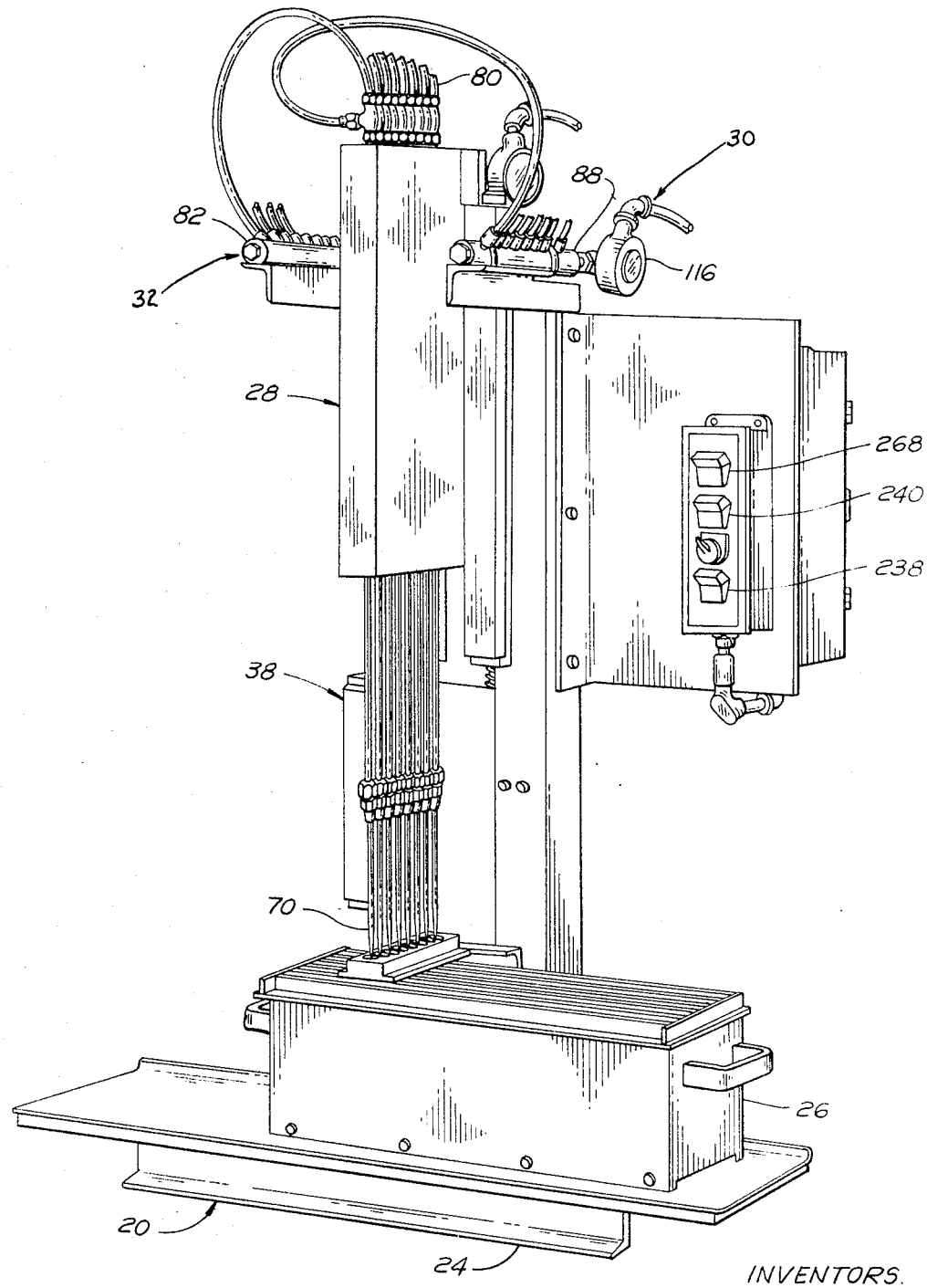
FIG. 1 is a perspective view of a preferred embodiment of the invention.
Figure 3:
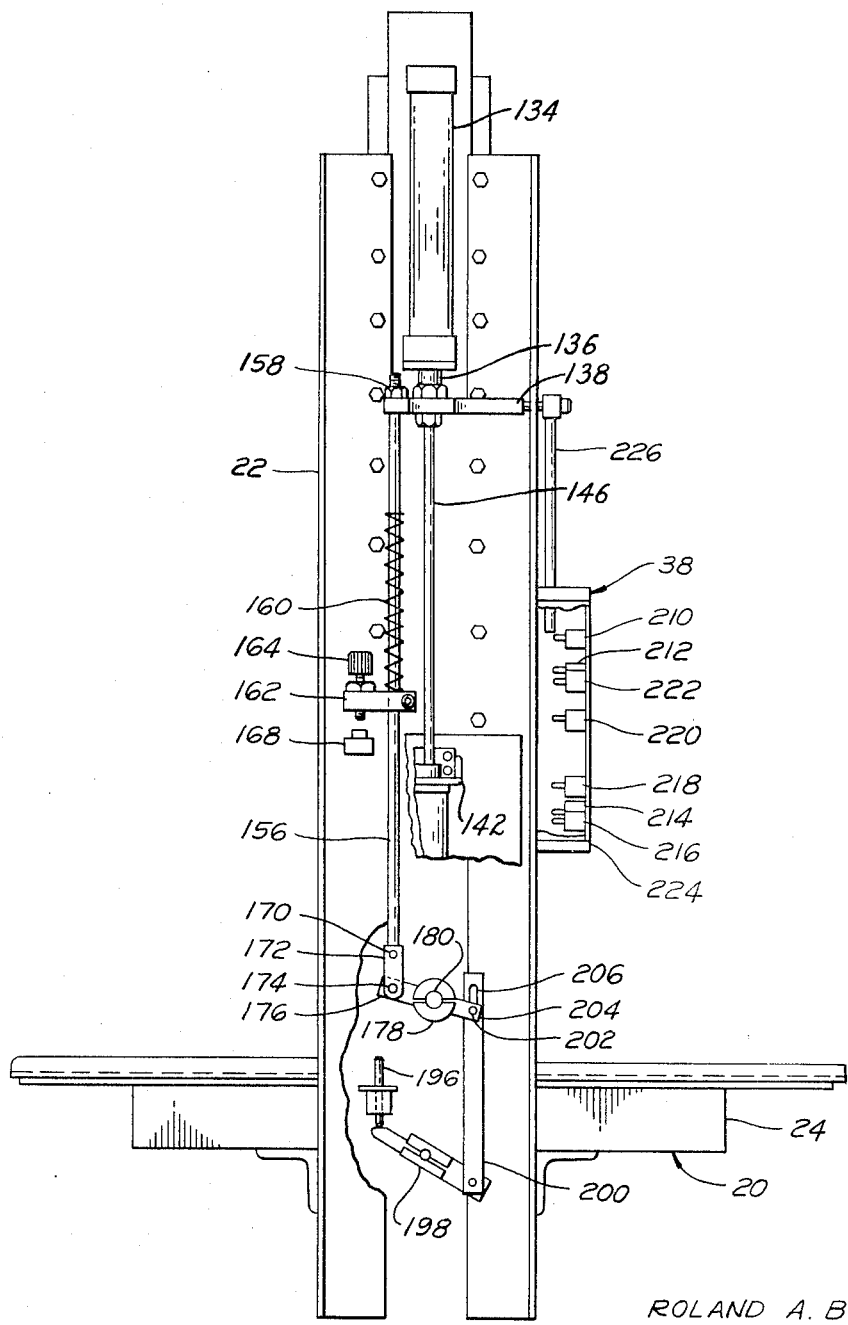
FIG. 3 is a rear elevation of the apparatus shown in FIG. 2 with certain parts broken away for clarity.
Figure 4:
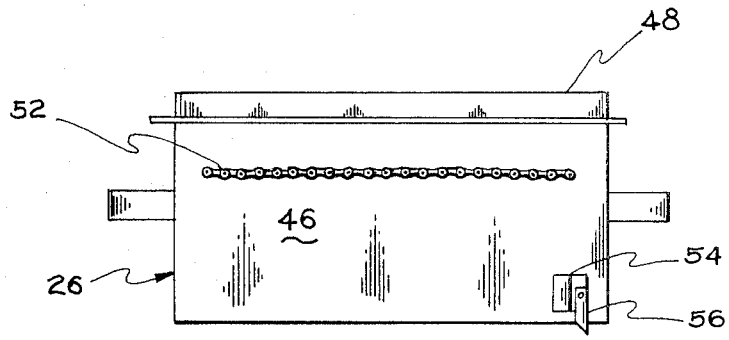
FIG. 4 is a detail side elevation of the material enclosure means shown in FIG. 1.
Figure 5:
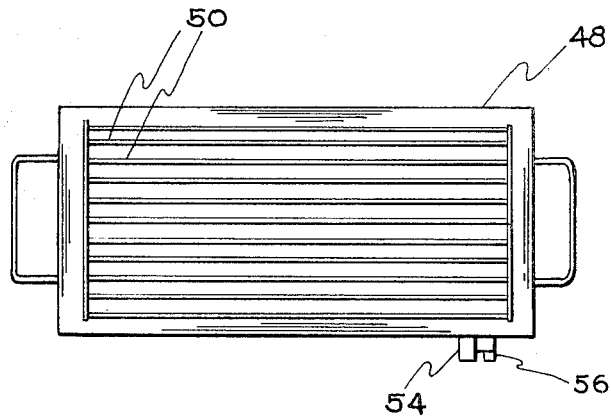
FIG. 5 is a plan view of the portion of the apparatus shown in FIG. 4.

Referring to FIGS. 1 through 3, the preferred apparatus may be seen to comprise eight major components that will be described in further detail. These components are a frame generally 20, including a vertical member 22 and a horizontal member 24, whereupon a material enclosure means generally 26 is constrained to move upon the horizontal member 24. An injector means generally 28 is mounted for vertical reciprocation upon the vertical member 22 of the frame generally 20. Gas supply means generally 30 and additive substance supply means generally 32 are connected to the upper portion of the injector means generally 28; and the latter is caused to move by a reciprocable power means generally 34. The power means also actuates an indexing means generally 36 that intermittently propels the material enclosure means generally 26. A control means 38, the mechanical portion of which may be seen in FIG. 3, attached to the vertical member 22 is intended mainly to control the flow of gas and additive substance from the respective means 30 and 32 to the injector means generally 28.

In operation the apparatus begins with the injector means generally 28 in the uppermost position. An item of meat is placed in the enclosure means generally 26, the forward end of which will be just beneath the injector means generally 28, and the power means 34 will drive the latter downwardly. During the downward stroke the control means 38 will cause pressurized gas from supply means 30 to be injected through the injector means 28. On the upward stroke the control means 38 will cause a quantity of additive substance to be injected through the injector means 28. The supply of both gas and additive substance will be terminated before the injector means 28 reaches the upper limit of its upward movement. Also just before reaching the upper limit the indexing means generally 36 will be actuated to advance the enclosure means generally 26.

THE MATERIAL ENCLOSURE MEANS

The material enclosure means generally 26 comprises a rectangular box 46 preferably constructed of stainless steel. The box has a foraminous cover 48 comprised of a series of equally spaced slats 50 extending longitudinally of a peripheral frame. Along one side of the box 46 is secured, by welding or the like, a length of sprocket chain 52 or a rack or the like. Also extending outwardly from the lower forward portion of the same side of box 46 is a mounting block 54 having a vertical channel within which a detent 56 is pivotally mounted in alignment with the ends of the spaces between the various slats 50 of the cover member 48. The detent can be pivoted counterclockwise, but clockwise movement is restricted by the block 54, and is used to accurately position the box 46.

The enclosure means 26 is slidable upon a pair of rails 58 mounted upon the horizontal member 24 of the frame generally 20. The bottom of the box 46 may be appropriately keyed to slidably receive the rails 58.

THE INJECTOR MEANS

Figure 6:
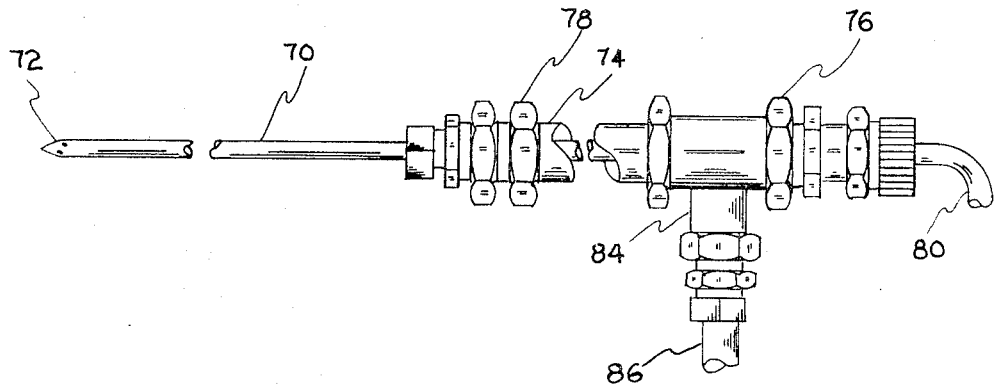
FIG. 6 is a detailed view of a part of FIG. 2.

The injector means generally 28 is comprised of a plurality of hollow needle assemblies (as shown in FIG. 6) mounted vertically within a housing 66. The housing in turn is slidably received in a vertical guideway 68 ranged along the upper portion of the vertical frame member 22. In the preferred embodiment a total of 8 needle assemblies in a single row are utilized. A greater or fewer number of such assemblies ranged in either a single or in multiple rows may be arranged if desired. Each needle assembly comprises a hollow needle core 70 extending the full length of the assembly and beyond to terminate it in a closed point 72 having a series of four minute orifices arranged about the lower end within about 0.3 inch of the point. The needle core 70 may extend as much as 9 inches, and perhaps more, beneath the housing 66. Within the housing the needle core 70 is enclosed within a concentric gas tube 74 which is closed at both ends by mounting ferrules 76, 78. At the upper end of the housing 66 the needle core 70 is connected by appropriate connectors and a plastic tube 80 to a liquid manifold 82. The gas tube 74 includes a T connector 84 at its upper end which, in turn, is connected by suitable connectors and a plastic tube 86 to a gas manifold 88. One or more minute openings (not shown) are drilled in the needle core 70 near the lower ferrule 78 where enclosed by the gas tube 74 to enable admixture of gas and liquid at that point.

Because the needle cores 70 of the injector means generally 28 extend several inches beneath the housing 66, and are intended to penetrate several inches into a body of meat, it is preferable to include a separate guiding die 96 between the housing 66 and the cover 48 of the enclosure means generally 26. The guiding die 96 may simply be a body of plastic material 98 having a plurality of holes 100 corresponding to the needle cores 70, which is securely fastened to the vertical member 22 of frame generally 20 at a level just above the top of the enclosure means generally 26.

GAS AND ADDITIVE SUBSTANCE SUPPLY MEANS

Figure 7:
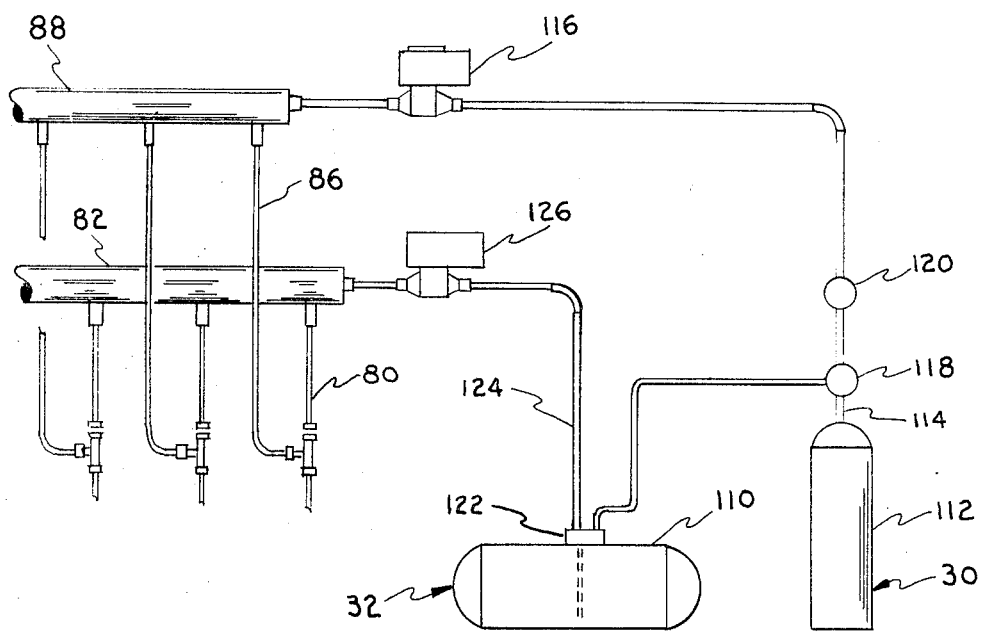
FIG. 7 is a schematic diagram of gas and additive substance supply means.

Provision for supplies of gas and additive substance may be best seen in FIG. 7. The preferred apparatus is intended for the injection of enzyme into meat. Accordingly a closed vessel 110 is provided for liquid enzyme material. A source of pressurized gas, such as a nitrogen tank 112, is also provided. Gas under regulated pressure is connected by a hose 114 to the vessel 110 and also to a solenoid actuated gas valve 116. The connection to vessel 110 is through a pressure regulating valve 118, and a second pressure regulating valve 120 is positioned between the latter and the solenoid actuated valve 116. It is usually intended that the pressure on the additive liquid be slightly higher than the injection pressure on the gas, preferably 5–10 p.s.i. greater that the gas pressure of about 40–45 p.s.i. From the liquid vessel 110 liquid will be propelled by the gas pressure, through a filter 122 and hose 124 to another solenoid actuated valve 126.

The gas valve 116 and liquid valve 126 are, in turn, connected to the respective gas and liquid manifolds 88 and 82, respectively. It will now be apparent that the introduction of gas and liquid to the injector means generally 28 will be controlled by the solenoid valves 116 and 126.

THE RECIPROCABLE POWER MEANS

The housing 66 of the injector means generally 28 is driven up and down by a reciprocable means preferably comprising a pneumatic or hydraulic cylinder 134 mounted at the upper end of the vertical member 22 of the frame generally 20. Cylinder 134 is connected to suitable source of pressurized fluid or aid (not shown). A piston rod 136, extending from the lower end of cylinder 134, is securely fastened to a slidable bracket 138 which extends through the guideway 68 on the vertical member 22 and is connected to the injector means housing 66. According to the delivery of pressurized fluid to cylinder 134, the entire housing 66, and all components therein, will be raised and lowered. The distance through which the latter will be reciprocated may be adjusted by various well-known means available to limit the throw of piston rod 136, one form of which is hereinafter described. The speed of reciprocation may also be regulated mechanically, preferably by a Bellows Hydro-Check, which comprises a second cylinder 140 mounted to a fixed bracket 142 at the lower end of the vertical member 22, and having a piston rod 146 extending upwardly and securely fastened to the slidable bracket 138. This device accurately regulates component speed by metering oil through a tube 150 and needle valves (not seen) from one end of the cylinder 140 to the other, while compensating for the change in volume caused by the piston rod 146 by means of a balance cylinder 152.

THE INDEXING MEANS

The above described reciprocable power means generally 34 also drives the index means generally 36 which stepwise advances the meat box 46. A portion of the vertical motion of the slidable bracket 138 is relayed by an actuator rod 156 extending downwardly to a point near the horizontal frame member 24. The actuator rod 156 is slidably received in a relatively larger hole in the slidable bracket 138, and will be lifted therewith by reason of an adjustment nut 158 threaded upon the upper end of the rod 156. A compression spring 160 is positioned concentrically about the rod 156 beneath the slidable bracket 138 and extends between the latter and a split block 162 fastened to the rod.

The split block 162 is secured to the rod 156 by a series of set screws or the like and extends outwardly thereof to threadedly support an index screw 164. The latter may be turned by hand to adjust the distance that the point thereof extends beneath the split block 162. A cooperating stop block 168 is fastened to the vertical frame member 22 in the path of the index screw 164. It should be noted that the split block 162 is positioned a distance along rod 156 beneath the adjustment nut 158 greater than the maximum throw of the rod 136 of power cylinder 134.

In operation, when the slidable bracket 138 is driven downwardly, it will force the actuator rod 156 downwardly by moving the compression spring 160 against the split block 162. However, the distance that the actuator rod 156 can move downwardly is limited by the distance between the end point of the index screw 164 and the stop block 168. Thus when the index screw 164 contacts the block 168 movement of actuator rod 156 will stop while the slidable bracket 138 and the injector means generally 28 will continue to move downwardly.

The lower end of the actuator rod 156 is connected by a pin 170 to a clevis 172 which in turn is connected by a pivot pin 174 to an arm 176 of a clutch housing 178. The clutch is of a one-way ratchet and pawl type (not shown) wherein the housing 178 acts as a pawl to turn an internal ratchet (not shown) mounted upon a sprocket shaft 180 which is, in turn, journaled in bearings 182 on the vertical frame member 22 just above the horizontal member 24. Upon the forward end of the sprocket shaft 180, opposite the clutch housing 178, is a drive sprocket 190. The latter is of a size and diameter selected to mate with the sprocket chain 52 that is fastened to the rectangular meat box 46.

In the aforementioned apparatus the clutch housing 178 and internal mechanisms are assembled so as to turn the sprocket shaft 180 and sprocket 190 only upon upward movement of the actuator rod 156. As previously explained the latter is moved only during a fraction of the uppermost movement of the slidable bracket 138. Thus when the injector means generally 28 begins its downward movement, the actuator rod 156 will be lowered a short distance, cocking the clutch, and thereafter come to rest by reason of the index screw 164 contacting the stop block 168. Thereafter the injector means generally 28 will complete its downward stroke, propelled by action of power cylinder 134 and rod 136, and nearly complete its upward stroke whereupon the slidable bracket 138 will contact the adjustment nut 158 at the top of rod 156 to lift the latter and pivot upwardly the arm 176 on clutch housing 178, thereby engaging the sprocket shaft 180 and rotating the drive sprocket 190.

It is desired that, at the beginning of operation the meat box 46 be positioned at a precise location to properly align the needle cores 70 with the ends of the slots between slats 50 in the foraminous cover 48 of the box. This is accomplished by lifting a stop pin 196 so as to engage the forward face of detent 56 on mounting block 54 fastened along the bottom of the box 46. The pin 196 is lifted by a pivotally mounted cam 198 which is, in turn, connected to be moved by a link 200. The link 200 is, in turn, raised and lowered by a pin 202 fastened to the end of a second arm 204 extending from the clutch housing 178 opposite the aforementioned arm 176. The pin 202 is received in a slot 206 on the link 200 so that the link 200 will be raised only at the conclusion of the cocking motion of sprocket 190, thereby allowing the pin 196 to be lowered by its weight in which position the part will remain until the slideable bracket 138 reaches the top of its motion and lifts the weight of rod 156 to turn the clutch housing. Because of the pivoted mounting of the detent 56, the box 46 can be moved rearwardly across the raised pin 196, but will be accurately stopped thereby when moved forwardly.

Figure 9:
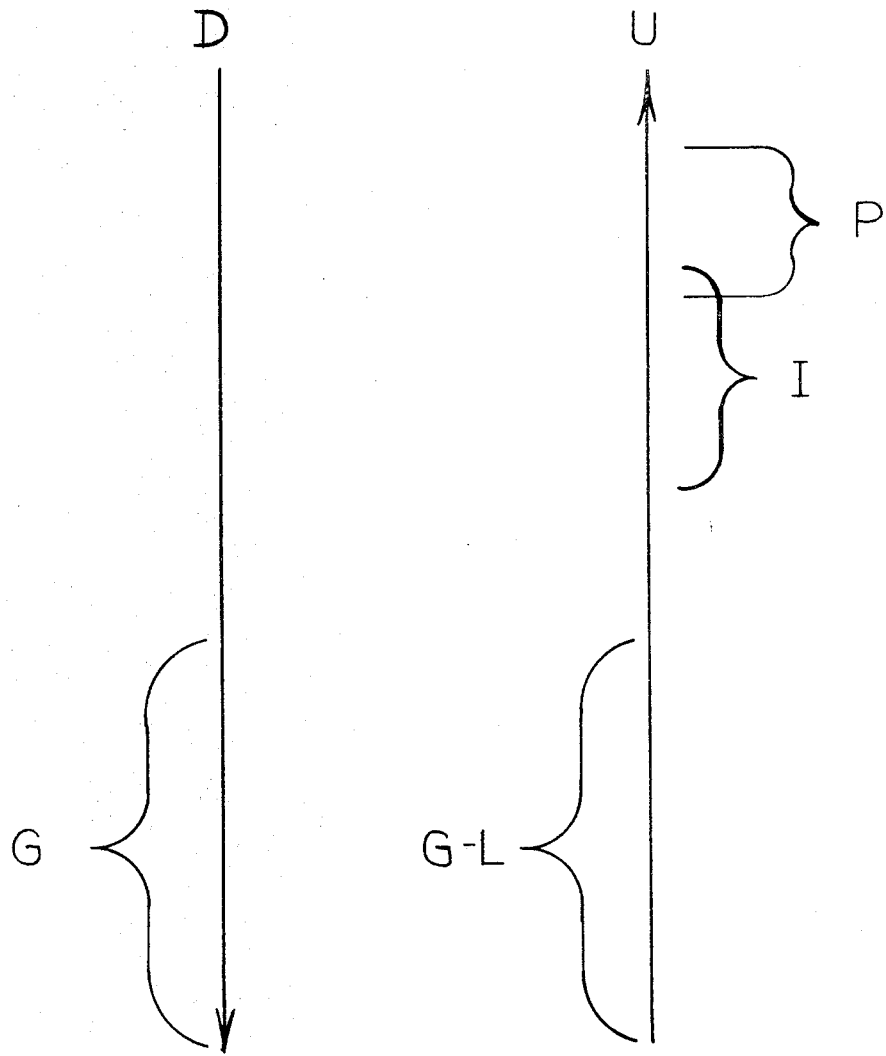
FIG. 9 is a motion diagram showing the sequence of operation of the apparatus of FIG. 1.

It will have become clear from the foregoing that the meat box 46 will be indexed forwardly a precise increment of distance only as the injector means generally 28 reaches the uppermost limit of its motion and after the needles 70 have been withdrawn from the product and are clear of the cover 48 on the meat box 46. The motion sequence is illustrated in FIG. 9 wherein arrows D and U represent the downward and upward strokes, respectively. The brackets I and P associated with the arrow U represent the portion of the stroke devoted to the indexing and pin lifting actions, respectively. Once the box 46 is initially positioned by the detent 56 against pin 196, subsequent indexing will uniformly advance it in equal increments.

THE CONTROL MEANS

During the course of the operative strokes represented on FIG. 9 it is desired to first inject a quantity of gas from the tank 112 and then to inject a further quantity of gas with liquid from vessel 110. In operation it is preferred that the gas is injected during the downstroke and the mixture of gas and liquid is injected on the upstroke of the needles 70. The latter actions are represented by the bracket G and G–L shown on FIG. 9. As previously indicated the introduction of gas and liquid is controlled by solenoid valves 116 and 126, respectively. The latter are actuated in accordance with a plurality of spring return limit switches 210, 212, 214, 216, 218, 220 and 222 which are mounted in two vertical rows along a switch box 224 at the side of the vertical frame 22. The aforementioned limit switches are actuated in vertical sequence and held in operative position by a control shaft 226, that is, in turn, connected to the slidable bracket 138 so as to be movable therewith.

Figure 8:
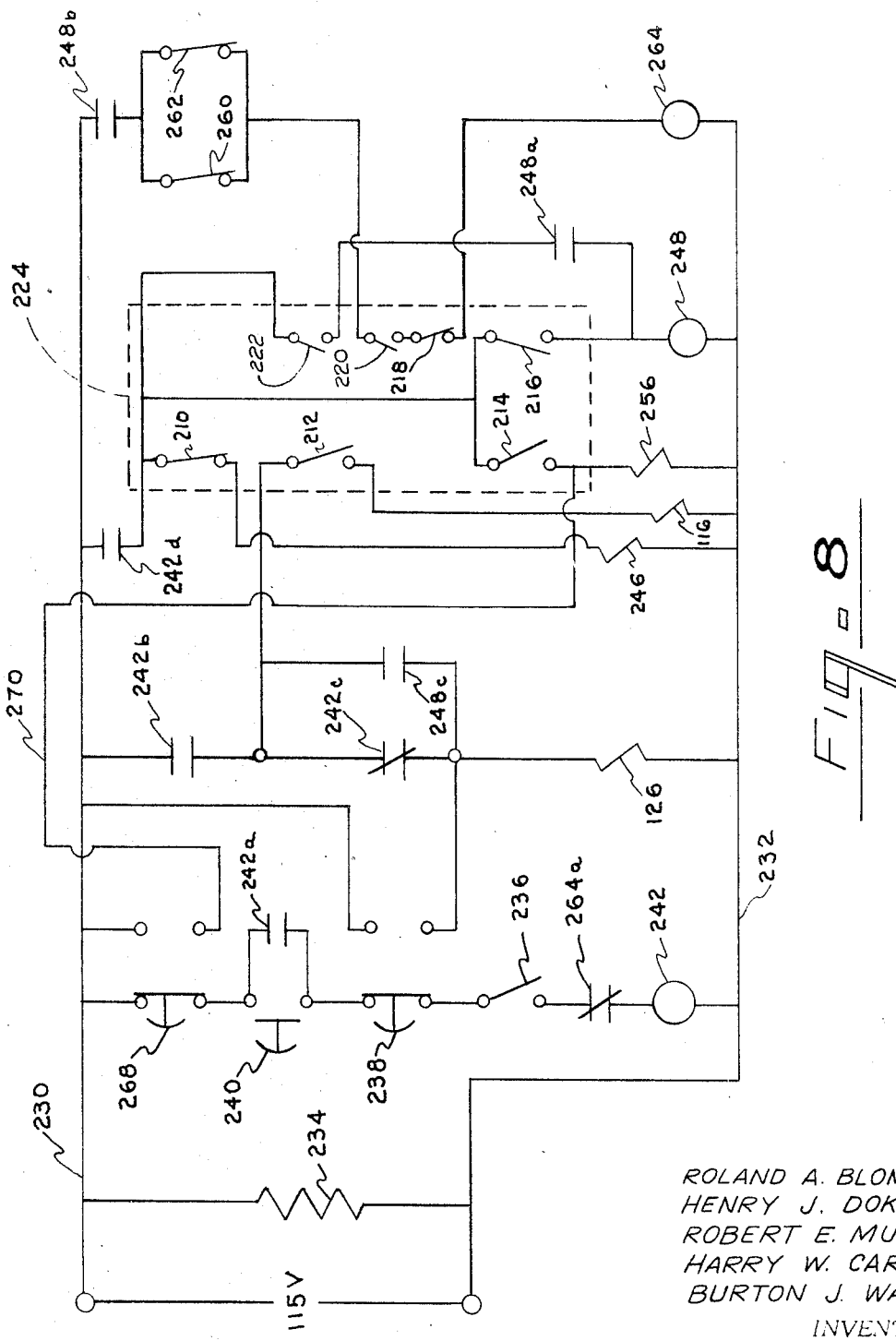
FIG. 8 is a control circuit diagram.

Operation of the apparatus may be followed with reference to the control circuit shown in FIG. 8 wherein the two vertical rows of switches are again shown as arranged within the box 224. The control circuit is powered by two main lines 230, 232 from a source of electric power. Since the apparatus is usually installed within refrigerated quarters, a heater 234 is provided across the main lines to keep certain parts of the circuitry warm. The apparatus may be started only when a material enclosure box 46 is in position to close a switch 236 on frame 24, and normally the machine is first manually primed at the beginning of a day of operation by closing a switch 238 which momentarily energizes the solenoid actuated valve 126 to the open position in the liquid line.

The machine is started by momentarily closing start switch 240 which completes a circuit between lines 230 and 232 to a time delay relay 242. The latter operates four pairs of contacts 242a through 242d. Normally open contacts 242a and 242b are closed immediately upon relay 242 being energized. Additional contacts 242c are opened and contacts 242d are closed after a brief time lapse. Thus it may be followed that relay 242 will first close contacts 242a to a holding circuit around start switch 240, and at the same time will close contacts 242b to complete a temporary circuit to solenoid actuated valve 126 to automatically prime the injection needles every time the apparatus is restarted, as when a succeeding box 46 closes the switch 236. After a brief period, sufficient only to allow adequate priming, the time delay will lapse and contacts 242c will open to disconnect the automatic priming circuit.

At this time power is connected to one side of the limit switches 210, 214, 216 and 222 through the relay contacts 242d. Since switch 210 is normally closed power will be delivered immediately to a solenoid 246 to move a control valve (not shown) to direct pressurized fluid to the upper end of cylinder 134 and thereby move the injector means generally 28 downwardly. Shaft 226 is also moved downwardly thereby and switch 210 will be opened, preparing the control valve for a later change. As the cylinder 134 drives the injector 28 and shaft 226 downwardly switches 212 and 222 will next be closed and are located so as to be contacted by the end of shaft 226 at the time the needle points 72 enter the material within a box 46. Switch 212 completes connection to the solenoid actuated valve 116 in the gas line, thus admitting pressurized gas to the needles 70; and switch 222 partly completes a holding circuit to a relay 248.

The shaft 226 next passes switch 220, closing it, and then opens switch 218 the functions of which will be later explained.

At the lower extremity of its stroke the shaft 226 closes switches 216 and 214, preferably switch 216 is closed slightly in advance of switch 214. Switch 216 completes a circuit to a relay 248, which, in turn, closes three pairs of contacts 248a, 248b and 248c. Contacts 248a complete a holding circuit with previously closed limit switch 222 to maintain the relay 248 energized until upward movement of shaft 226 opens the latter. Contacts 248b complete a quality control circuit to be explained. Contacts 248c complete a circuit to the solenoid actuated valve 126 to open the valve and admit liquid to the needles 70. Limit switch 214 is then quickly closed to complete a circuit to energize a solenoid 256 which shifts the position of the control valve (not shown) to direct pressurized fluid to the lower end of the cylinder 134 thereby raising the injector means 28.

During the upward stroke both gas valve 116 and liquid valve 126 will remain open until the shaft 226 passes limit switches 212 and 222 allowing them to reopen and extinguish the circuits to the valves. Before reaching that level the shaft 226 will release switch 218 to reclose. At that time relay 248b will be closed and switch 220 will be held closed thus completing a circuit to a pair of condition switches 260 and 262 through a relay 264. Switch 260 is located in the gas manifold 88 and is held open only if operating gas pressure is present; otherwise the switch 260 will close. Similarly switch 262 is located in the liquid manifold 82 and is held open only by moving liquid (not pressure). If the liquid is not flowing through manifold 82 the switch 262 will close. Thus upon failure of gas pressure or liquid flow to the injector needles a circuit will be completed to the relay 264 thereby opening a single pair of contacts 264a, placed in series with start switch 240 and relay 242 between lines 230 and 232, which in turn would shut down the apparatus.

Otherwise, assuming proper gas pressure and liquid flow, the shaft 226 will next disconnect the circuit to relay 264 by allowing switch 220 to open. Thereafter switches 212 and 222 are reopened, extinguishing the circuits to both liquid valve 126 and gas valve 116, and the flow of gas and liquid to needles 70 is ceased as the latter raise above the box 46. Finally shaft 226 reaches its uppermost position and switch 210 recloses again energizing solenoid 246 to shift the control valve (not shown) and start the next downward cycle of the machine. The cycle will repeat continuously as the box 46 is mechanically indexed forwardly until the box moves sufficiently to release switch 236. Since the indexing mechanism, previously described, operates to rotate the drive sprocket 190 to advance the box 46 only upon the uppermost increment of upward movement of the bracket 138 (and hence similar position of injector assembly 28 and control shaft 226) the switch 236 will be opened only when the injection assembly is in the up position. Similarly, if it becomes necessary during automatic operation to stop the apparatus an operator may depress a stop switch 268 to deenergize relay 242 and associated contacts. This act also closes a second pair of contacts to directly energize the solenoid 256 through a wire 270, hence immediately shifting the control valve to cause pressurized fluid to be directed to the lower end of cylinder 134 and move the injector assembly upwardly.

It may be noted that the vertical position of limit switches 210 through 222 can be adjusted so as to alter somewhat the operating characteristics of the apparatus such as depth and height of movement and initation and termination points for gas and liquid flow. Such adjustments in combintion with a control of vertical movement rate, or speed, provided through the Hydro-Check unit 140, allow ample regulation of the quantity of liquid injected during each machine stroke—the flow rate of liquid being virtually a constant function of the gas pressure and needle orifice size. While the total quantity of injected liquid could also be regulated, to some extent, by adjustment of the gas pressure in the system, it is preferred that the latter not be varied except to accommodate different type of solid material to be treated where particular gas pressures within the range previously stated may be found to be of unique advantage for certain specific materials.

Obviously, many modifications and variations of the invention as hereinbefore set forth may be made without departing from the spirit and scope thereof. For example, it would be equivalent to arrange the needles 70 in a different configuration such as in plural rows. Also, it would be equivalent to index the injector mechanism generally 28 through horizontal movement with respect to the meat box 46. Therefore, only such limitations should be imposed as are indicated in the appended claims.

We claim:

1. An improved apparatus for distributing a substance through a meat item that is held within an enclosure means having a foraminous top member preventing upward displacement of said material, said apparatus comprising: an enclosure means formed of a rectangular box with a cover member having a plurality of longitudinal slats with even spaces therebetween; an injector means mounted for reciprocation toward and away from said foraminous to of said rectangular box, said injector means including a plurality of hollow needle assemblies, asid needle assemblies being spaced and aligned with the spaces between said slats; a first means to connect a supply of pressurized gas to said injector means; a second means to connect a supply of pressurized substance to said injector means, both said first and second means to connect including separate plastic tubes running between upper portions of each hollow needle assembly and manifolds for gas and substance; an indexing means to move one of said enclosure means and injector means stepwise along the path respecting the other whereby to obtain an even spacing of injections throughout the length of said meat item.

2. The apparatus of claim 1 including a control means connected to move in accordance with said injector means and regulate the introduction of said gas and said substance therethrough.

3. The apparatus of claim 2 wherein the control means includes a plurality of switches operated by a shaft that is connected to move with said injector means.

4. The apparatus of claim 2 including means within said control means to limit the upward and downward reciprocatory strokes of said injector means.

5. The apparatus of claim 2 including valves connected between each of said supplies and said injector means, and said control means is connected to operate said valves.

6. The apparatus of claim 1 including reciprocal power means connected to said injector means and a means to control the speed thereof is also connected thereto.

7. The apparatus of claim 1 wherein said indexing means moves said enclosure means horizontally beneath said injector means.

8. The apparatus of claim 7 wherein the indexing means comprises a sprocket mounted to cooperate with a chain fixed to a side of said enclosure means, said sprocket having a clutch to impart rotary motion thereto in one direction only and said clutch being connected to be actuated by said injector means to rotate said sprocket during only the last and minor portion of the upward reciprocable movement of said injector means.

9. The apparatus of claim 8 wherein the injector means comprises a plurality of spaced hollow needles extending a substantial unsupported vertical distance and a guiding die having openings corresponding to said needles is positioned above the enclosure means in the path of said needles.

10. The apparatus of claim 9 including in combination therewith a length of sprocket chain secured to one side of said box for cooperative engagement with said sprocket, and a pivotal detent adjacent one end thereof for accurately positioning said box beneath said needles.

References Cited

UNITED STATES PATENTS

| | | | |
|---|---|---|---|
| 2,490,765 | 12/1949 | Abbott. | |
| 2,641,990 | 6/1953 | Allbright et al. | 99—257 |
| 2,645,172 | 7/1953 | Allbright et al. | 99—257 |
| 2,699,717 | 1/1955 | Moreland et al. | 99—257 |
| 2,741,974 | 4/1956 | Avery | 99—257 |
| 2,821,901 | 2/1958 | Abrams | 99—257 |
| 3,119,696 | 1/1964 | Williams | 99—257 |
| 3,216,826 | 11/1965 | Wattenbarger | 99—174 XR |
| 3,296,953 | 1/1967 | Bjrn-Henriksen et al. | 99—256 |
| 3,334,570 | 8/1967 | Nordin et al. | 99—257 |
| 3,381,603 | 5/1968 | Jensen et al. | 99—257 |
| 2,078,525 | 4/1937 | Bruesewitz | 68—201 XR |
| 3,035,508 | 5/1962 | Nelson | 99—257 |

WALTER A. SCHEEL, Primary Examiner

A. O. HENDERSON, Assistant Examiner

U.S. Cl. X.R.

68—201; 27—24; 128—216